United States Patent
Nagle

(10) Patent No.: US 7,693,833 B2
(45) Date of Patent: Apr. 6, 2010

(54) SYSTEM AND METHOD FOR IMPROVING INTEGRITY OF INTERNET SEARCH

(76) Inventor: John Nagle, 999 Woodland Ave., Menlo Park, CA (US) 94025

( * ) Notice: Subject to any disclaimer, the term of this patent is extended or adjusted under 35 U.S.C. 154(b) by 351 days.

(21) Appl. No.: 11/701,868

(22) Filed: Feb. 1, 2007

(65) Prior Publication Data

US 2008/0189263 A1   Aug. 7, 2008

(51) Int. Cl.
*G06F 17/30* (2006.01)
(52) U.S. Cl. ............ 707/3; 707/4; 707/5; 707/7; 707/10; 705/1; 705/10; 705/14; 705/26
(58) Field of Classification Search .......... 707/3–5, 707/7, 10; 705/1, 10, 14, 26, 80
See application file for complete search history.

(56) References Cited

U.S. PATENT DOCUMENTS

| | | | |
|---|---|---|---|
| 5,668,990 A | 9/1997 | Pettner et al. | |
| 5,944,793 A | 8/1999 | Islam et al. | |
| 6,112,181 A | 8/2000 | Shear et al. | |
| 6,314,420 B1 | 11/2001 | Lang et al. | |
| 6,317,718 B1 | 11/2001 | Fano | |
| 6,336,105 B1 | 1/2002 | Conklin et al. | |
| 6,337,743 B1 | 1/2002 | Girardi et al. | |
| 6,427,140 B1 | 7/2002 | Ginter et al. | |
| 6,539,396 B1 | 3/2003 | Bowman-Amuah | |
| 6,546,388 B1 | 4/2003 | Edlund et al. | |
| 6,560,600 B1 | 5/2003 | Broder | |
| 6,631,372 B1 | 10/2003 | Graham | |
| 6,633,878 B1 | 10/2003 | Underwood | |
| 6,640,304 B2 | 10/2003 | Ginter et al. | |
| 6,641,037 B2 | 11/2003 | Williams | |
| 6,643,650 B1 | 11/2003 | Slaughter et al. | |
| 6,654,742 B1 | 11/2003 | Kobayashi et al. | |
| 6,658,568 B1 | 12/2003 | Ginter et al. | |
| 6,704,873 B1 | 3/2004 | Underwood | |
| 6,718,324 B2 | 4/2004 | Edlund et al. | |
| 6,734,886 B1 | 5/2004 | Hagan et al. | |
| 6,778,986 B1 | 8/2004 | Stern et al. | |
| 6,789,077 B1 | 9/2004 | Slaughter et al. | |

(Continued)

OTHER PUBLICATIONS

"Managerial Search and the Pursuit of Opportunity"—Maggitti et al.—department of mangement and Organization—university of MaryLand, College park—2006 (pp. 1-144) lib.umd.edu.*

(Continued)

*Primary Examiner*—Jean B Fleurantin
*Assistant Examiner*—Anh Ly
(74) *Attorney, Agent, or Firm*—Hall Estill; William C. Milks, III

(57) ABSTRACT

A system and method are provided to receive a search query from a user, typically via a web browser, the Internet, and a web server. A search engine obtains a set of potential search results based on the search query. For each Internet domain or web site mentioned in the search results, a set of data sources is accessed to obtain information concerning the legitimacy of the business associated with the Internet domain or web site. The legitimacy information is used to reorder or to change or to augment the appearance or presentation of the search result for the Internet domain or web site. The processed search results are returned to the user.

8 Claims, 19 Drawing Sheets

U.S. PATENT DOCUMENTS

| | | | |
|---|---|---|---|
| 6,845,370 B2 | 1/2005 | Burkey et al. | |
| 6,873,982 B1 | 3/2005 | Bates et al. | |
| 6,934,859 B2 | 8/2005 | Aull | |
| 6,941,455 B2 | 9/2005 | Aull | |
| 6,973,450 B1 | 12/2005 | Silverbrook et al. | |
| 6,978,266 B2 | 12/2005 | Larason et al. | |
| 6,983,272 B2 | 1/2006 | Davis et al. | |
| 7,003,513 B2 | 2/2006 | Geiselhart | |
| 7,080,064 B2 * | 7/2006 | Sundaresan | 707/3 |
| 7,082,429 B2 * | 7/2006 | Lin et al. | 707/5 |
| 7,085,761 B2 | 8/2006 | Shibata | |
| 7,089,237 B2 | 8/2006 | Turnbull et al. | |
| 7,092,901 B2 | 8/2006 | Davis et al. | |
| 7,099,859 B2 * | 8/2006 | Sundaresan | 707/3 |
| 7,103,593 B2 | 9/2006 | Dean | |
| 7,114,177 B2 | 9/2006 | Rosenberg et al. | |
| 7,117,206 B1 | 10/2006 | Bharat et al. | |
| 7,136,860 B2 * | 11/2006 | Doliov | 707/101 |
| 7,447,691 B2 * | 11/2008 | Doliov | 707/9 |
| 7,457,823 B2 * | 11/2008 | Shraim et al. | 707/104.1 |
| 7,509,344 B1 * | 3/2009 | Kamvar et al. | 707/104.1 |
| 2002/0042784 A1 | 4/2002 | Kerven et al. | |
| 2002/0049707 A1 | 4/2002 | Townsley | |
| 2003/0004936 A1 | 1/2003 | Grune et al. | |
| 2003/0014403 A1 | 1/2003 | Chandrasekar et al. | |
| 2003/0033298 A1 | 2/2003 | Sundaresan | |
| 2003/0033299 A1 | 2/2003 | Sundaresan | |
| 2003/0187832 A1 | 10/2003 | Reader | |
| 2003/0204502 A1 | 10/2003 | Tomlin et al. | |
| 2004/0054661 A1 * | 3/2004 | Cheung et al. | 707/3 |
| 2004/0078192 A1 | 4/2004 | Poltorak | |
| 2004/0158559 A1 * | 8/2004 | Poltorak | 707/3 |
| 2004/0181427 A1 | 9/2004 | Stobbs et al. | |
| 2005/0223000 A1 | 10/2005 | Davis et al. | |
| 2005/0234904 A1 | 10/2005 | Brill et al. | |
| 2005/0289140 A1 | 12/2005 | Ford et al. | |
| 2006/0069697 A1 * | 3/2006 | Shraim et al. | 707/102 |
| 2006/0095416 A1 * | 5/2006 | Barkhin et al. | 707/3 |
| 2006/0155751 A1 * | 7/2006 | Geshwind et al. | 707/102 |
| 2006/0173920 A1 * | 8/2006 | Adler et al. | 707/104.1 |
| 2006/0195440 A1 | 8/2006 | Burges et al. | |
| 2006/0200460 A1 | 9/2006 | Meyerzon et al. | |
| 2006/0206476 A1 | 9/2006 | Kapur et al. | |
| 2006/0218138 A1 | 9/2006 | Weare | |
| 2006/0218141 A1 | 9/2006 | Tuttle et al. | |
| 2006/0224577 A1 | 10/2006 | Hullender et al. | |
| 2006/0224579 A1 | 10/2006 | Zheng | |
| 2006/0230037 A1 * | 10/2006 | Sugiyama et al. | 707/6 |
| 2006/0242138 A1 | 10/2006 | Brill et al. | |
| 2006/0248072 A1 * | 11/2006 | Brewer et al. | 707/5 |
| 2006/0253458 A1 * | 11/2006 | Dixon et al. | 707/10 |
| 2007/0214133 A1 * | 9/2007 | Liberty et al. | 707/5 |
| 2007/0288256 A1 * | 12/2007 | Speier | 705/1 |
| 2008/0015928 A1 * | 1/2008 | Chandra | 705/10 |
| 2008/0154847 A1 * | 6/2008 | Chellapilla et al. | 707/3 |
| 2008/0183664 A1 * | 7/2008 | Cancel et al. | 707/2 |
| 2008/0183745 A1 * | 7/2008 | Cancel et al. | 707/102 |
| 2008/0189281 A1 * | 8/2008 | Cancel et al. | 707/6 |

OTHER PUBLICATIONS

"Intelligent tools for managing factual arguments"—Marc Lauritsen—Proceedings of the 10$^{th}$ International conference on Artificial Intelligent and Law—ACM—2005 (pp. 95-104).*

Gyongyi, Zoltan and Garcia-Molina, Hector, "Web Spam Taxonomy," Technical Report, Stanford University, Mar. 14, 2004.

Comodo IdAuthority (http://www.idauthoity.com/text/new), Jan. 27, 2007.

* cited by examiner

London Hotels -Discount London Hotels by LondonNights.com
London Hotels - FREE London Hotels Reservations Service.
www.londonnights.com

London hotels by hotels-london.co.uk - Discount London Hotels
London hotels reservation service offering discounts on all hotels in London, UK.
www.hotels-london.co.uk

London Hotels, London apartments, Accommodation London
London Hotels? Try our London hotel Apartments.
www.apartmentsapart.com

London Hotels. Hotels in London. Hotels London. A large selection ...
London hotels. Popular Hotels at affordable prices, detailed information.
www.oanda.com

London Hotels -Discount London Hotels by LondonNights.com
London Hotels - FREE London Hotels Reservations Service.
www.londonnights.com

1504

London Hotels. Hotels in London. Hotels London. A large selection ...
London hotels. Popular Hotels at affordable prices, detailed information.
www.oanda.com

London hotels by hotels-london.co.uk - Discount London Hotels
London hotels reservation service offering discounts on all hotels in London, UK.
www.hotels-london.co.uk

1506

London Hotels, London apartments, Accommodation London
London Hotels? Try our London hotel Apartments.
www.apartmentsapart.com

1510

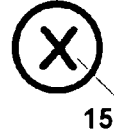
1508

*Fig. 15B*

SYSTEM AND METHOD FOR IMPROVING INTEGRITY OF INTERNET SEARCH

BACKGROUND OF THE INVENTION

The present invention relates to the field of search engines. More particularly, one embodiment of the present invention provides a system and method for improving a user search experience by identifying and reordering search results based on measures of business identifiability and integrity.

Internet search engine technology is now more than a decade old. Search engines began as a form of straightforward indexing. Today, they reflect an ongoing battle between "search engine optimization" companies trying to promote products and services, and search companies trying to produce search results resistant to attempts to "game" the search system.

Existing search engines for web pages use, primarily, information from web pages themselves, including the links between them, to determine which search results should be presented first. This is referred to herein as "intrinsic" information. In contrast, as referred to herein, "extrinsic" information is obtained from sources other than the web pages being indexed. Some extrinsic sources have substantially higher information reliability than intrinsic sources, and can potentially be used to validate information from the web pages themselves.

There have been tentative steps towards the use of extrinsic information by others, typically involving "blacklists" of "bad" web sites and "white lists" of "good" ones. The criteria for such lists have typically been ideological, rather than being based on an evaluation of the business. Such lists have typically covered only a small fraction of the existing web sites, and typically require considerable manual maintenance and attention. Such approaches have generally been deployed as site-blocking tools, rather than being used as a component of a search system. Lin, U.S. Pat. No. 7,082,429 discloses a system using lists of web sites.

Schemes for "spam filtering" in search engines have also been proposed, but these typically borrow from the recognition techniques for obvious spam used for spam filtering. Such approaches are susceptible to the same techniques which are in widespread use to evade spam filters. Some such approaches require search users to manually identify "spam," rather than performing the task automatically. Brewer, U.S. Patent Application No. 20060248072 discloses such an approach.

Schemes for allowing Internet users to vote on site ratings have been tried repeatedly, but such methods require much active effort by users and are susceptible to "ballot stuffing." Manual rating efforts and systems requiring user feedback or user surveys create demands on the end user's time which are not commercially competitive outside of narrow areas, such as hotel and restaurant ratings. The disclosures in Sundaresan, U.S. Pat. Nos. 7,080,064 and 7,099,859, which rely on a "ranking system for receiving any of users' (off-line or on-line) surveys or feedback about businesses," are examples of that approach. In contrast, the various embodiments of the present invention do not require the search system to conduct surveys or solicit user feedback.

Some specialized systems exist for the automated evaluation of intellectual property portfolios, typically by searching multiple databases for potential infringement, but this is a specialized application which relies on the formal structure of patent documents and claims, and is an unsuitable approach for general web search. Adler, U.S. Patent Application No. 20060173920 and Poltorak, U.S. Patent Application No. 20040158559 disclose such systems.

The various embodiments of the present invention overcome many of these limitations by automatically performing "due diligence" on Internet domains or web sites, using extrinsic data sources which are difficult for non-legitimate businesses to manipulate.

SUMMARY OF THE INVENTION

One object of the present invention is to create a user search or directory view of the World Wide Web with more real, legitimate businesses and far fewer marginal web sites, thus reducing user frustration and making web search more satisfying and effective.

Another object of the present invention is to perform an automated "due diligence" on Internet domains and web sites which offer products and services for sale. By accessing multiple databases to obtain information about the legitimacy of the seller, legitimate sellers can be moved upward in search results, while less legitimate sellers can be moved downward. This approach is resistant to most "search engine optimization" techniques.

A further object of the present invention is to encourage the proprietors of web sites to improve their legitimacy by complying with laws governing corporate registration and disclosure, by obtaining digital certificates which certify the identity of the business from certificate authorities, and by remaining in good standing with business rating services and business regulators. Such compliance is rewarded by better search engine results placement.

The method in accordance with one embodiment of the present invention comprises the steps of: receiving a search query from a user, typically via a web browser, the Internet, and a web server; using a search engine to obtain a set of potential search results; for each Internet domain or web site mentioned in the search results, accessing a set of data sources to obtain information concerning the legitimacy of the business; using said legitimacy information to reorder or to change or to augment the appearance or presentation of the search result for said Internet domain or web site; and returning the processed search results to the user. The results may then be displayed to the user.

The data sources used for evaluating business legitimacy may include, but are not limited to, extrinsic sources such as domain name registry databases, digitally signed certificates issued by certificate authorities, business rating information bureaus, state and national corporation records, business license records, filings with the U.S. Securities and Exchange Commission, enforcement actions by criminal justice agencies, enforcement actions by industry self-regulation groups, and similar sources.

In addition, the method in accordance with another embodiment of the present invention may include one or more local databases containing summary information derived from said extrinsic data sources, a program or "web crawler" which examines web sites in advance of user queries, and may be integrated into a search engine system as a component thereof.

Besides the method in accordance with the present invention, the present invention in one embodiment also provides computer code stored in a computer-readable medium to perform these operations on one or more computers.

The foregoing and other objects, features, and advantages of the present invention will become more readily apparent from the following detailed description of various embodiments, which proceeds with reference to the accompanying drawing.

BRIEF DESCRIPTION OF THE DRAWING

The various embodiments of the present invention will be described in conjunction with the accompanying figures of the drawing to facilitate an understanding of the present invention. In the drawing:

FIG. 15, comprising FIGS. 15A and 15B, illustrates the effect as presented to the user of formatting, reordering, and annotating search results;

DETAILED DESCRIPTION OF THE PREFERRED EMBODIMENTS

Figure 1:
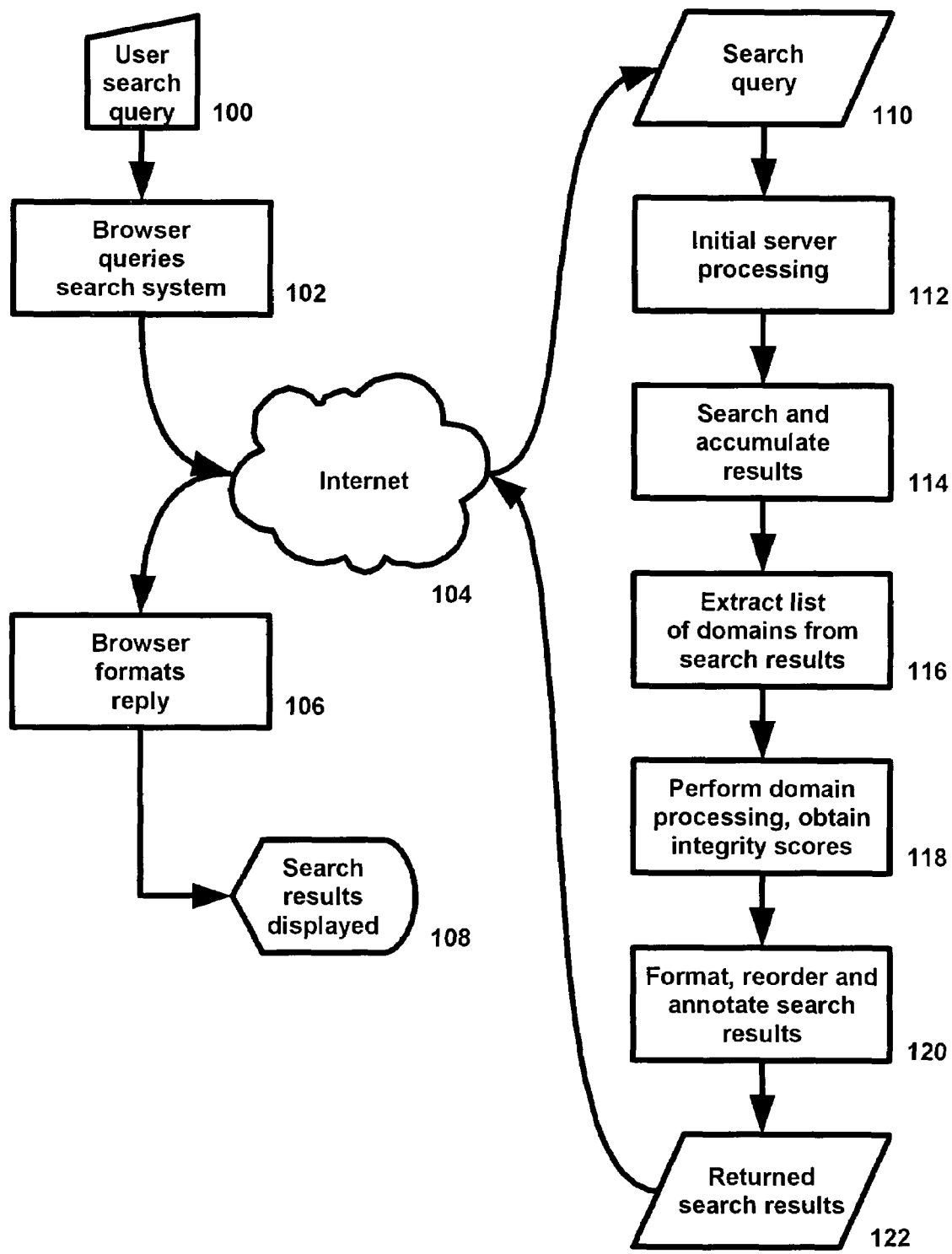
FIG. 1 illustrates a "search engine" for the World Wide Web on the Internet, augmented with the improvements provided by an embodiment of the present invention.

FIG. 1 illustrates a "search engine" for the World Wide Web on the Internet, augmented with the improvements provided by one embodiment of the method in accordance with the present invention. The illustrated use is the common case of a user querying a search engine through a web browser. The user search query 100 is typically entered manually by an end user and transmitted through a personal computer running a web browser able to handle such a query 102. The browser then transmits the query via the Internet 104 to a search engine, typically at a remote location, which receives the search query 110. The search engine then performs initial processing of the query 112 as is typical of a search engine. The search engine then performs the search and accumulates a set of search results 114, each of which contains at least a Uniform Resource Locator (URL) identifying an Internet domain and page on the World Wide Web selected by the search.

The improvements in accordance with the various embodiments of the method of the present invention then receive said search results, extract a list of URLs and domains 116, and perform domain processing 118, described in more detail below in conjunction with FIG. 2, on that list 116. This domain processing returns an integrity rating, which is then used in a step 120 to reorder and annotate the search results so as to move results with lower integrity ratings downward in the displayed results. The results thus generated 122 are then returned to the user's browser via the Internet. The user's browser preferably formats them for display 106, and the results are displayed on the user's display device 108.

Figure 2:
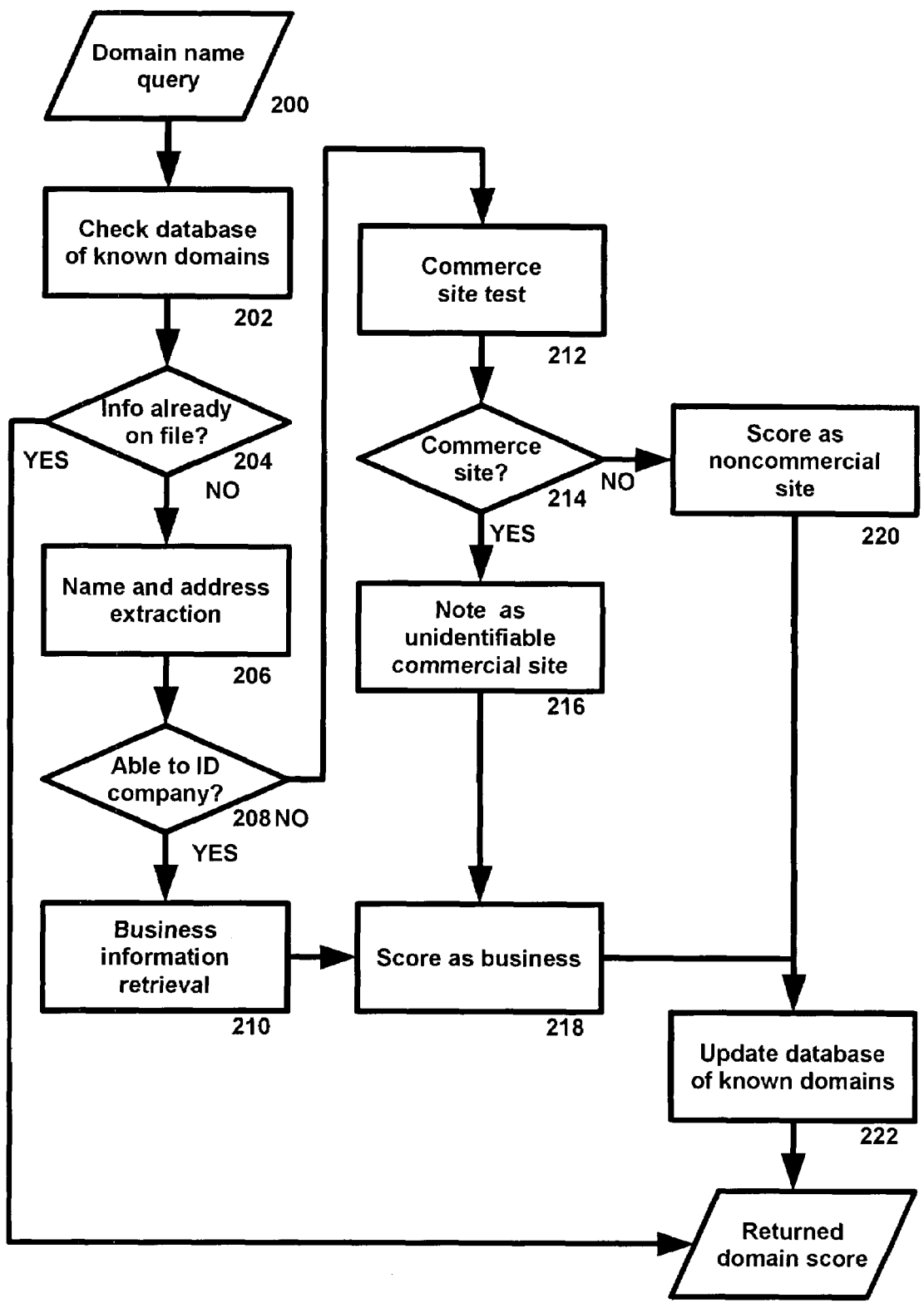
FIG. 2 illustrates domain processing and integrity rating in accordance with the embodiment of the present invention shown in FIG. 1.

FIG. 2 illustrates the "domain processing and integrity rating" step 118 in accordance with one embodiment of the method of the present invention, the process by which integrity ratings are produced. The domain name query 200, which includes an Internet domain as part of a URL, is first checked against a local database of known domains and URLs 202, for which integrity ratings are available. This is to eliminate unnecessary reprocessing of domains already evaluated. If the domain is in the database, a domain score is already available, and the test 204 bypasses further processing. A returned domain score 224 can then be returned immediately.

If the domain is not already in the database, further processing is required. The first step is to attempt to obtain a physical name and address (a postal or real-world address, not an Internet address) associated with the domain, using the multiple techniques of the name and address extraction step 206, further described below in conjunction with FIG. 3.

If a reliable name and address are obtained, the test 208 proceeds to the business information retrieval step 210, further described below in conjunction with FIG. 4. The information collected in step 210 is then forwarded to the scoring step 218, further described below in conjunction with FIG. 11, where a process similar to credit scoring is performed.

Finally, the scoring information is used to update the database of known domains 222 so that future similar queries can be quickly processed. The integrity rating score is then returned to the caller.

In the event that the name and address of the business cannot be located, the test 208 sends control to the commerce site test 212, further described below in conjunction with FIG. 9, where an attempt is made to determine whether or not the site appears on its face to be engaged in commerce, i.e., trying to sell something. If the site appears to be engaged in commerce, but one cannot reliably associate a name and address with it, the site is considered to be a less than legitimate business. Since in many jurisdictions, operating a business anonymously may be illegal, and in some jurisdictions (notably California) there are specific legal requirements that a business on the Internet prominently disclose its actual business name and address, the legitimacy of any business for which one cannot find a name and address is questionable. Thus, such a site is assigned a low integrity score in step 216, which will, in later processing, have the effect of substantially degrading its search result placement. This encourages Internet businesses to comply with the laws regarding such disclosure.

If the commerce site test 212 indicates that the site is not selling anything, but is simply informational (e.g., a news site, a personal home page or "blog," a technical paper, a legal document, or other non-marketing content), the branch 214 sends control to the non-commercial site scoring step 220, which returns a neutral integrity score. The embodiments of the method in accordance with the present invention preferably make no judgment about non-commercial content. The neutral score is passed forward to step 222 and processed as above.

Figure 3:
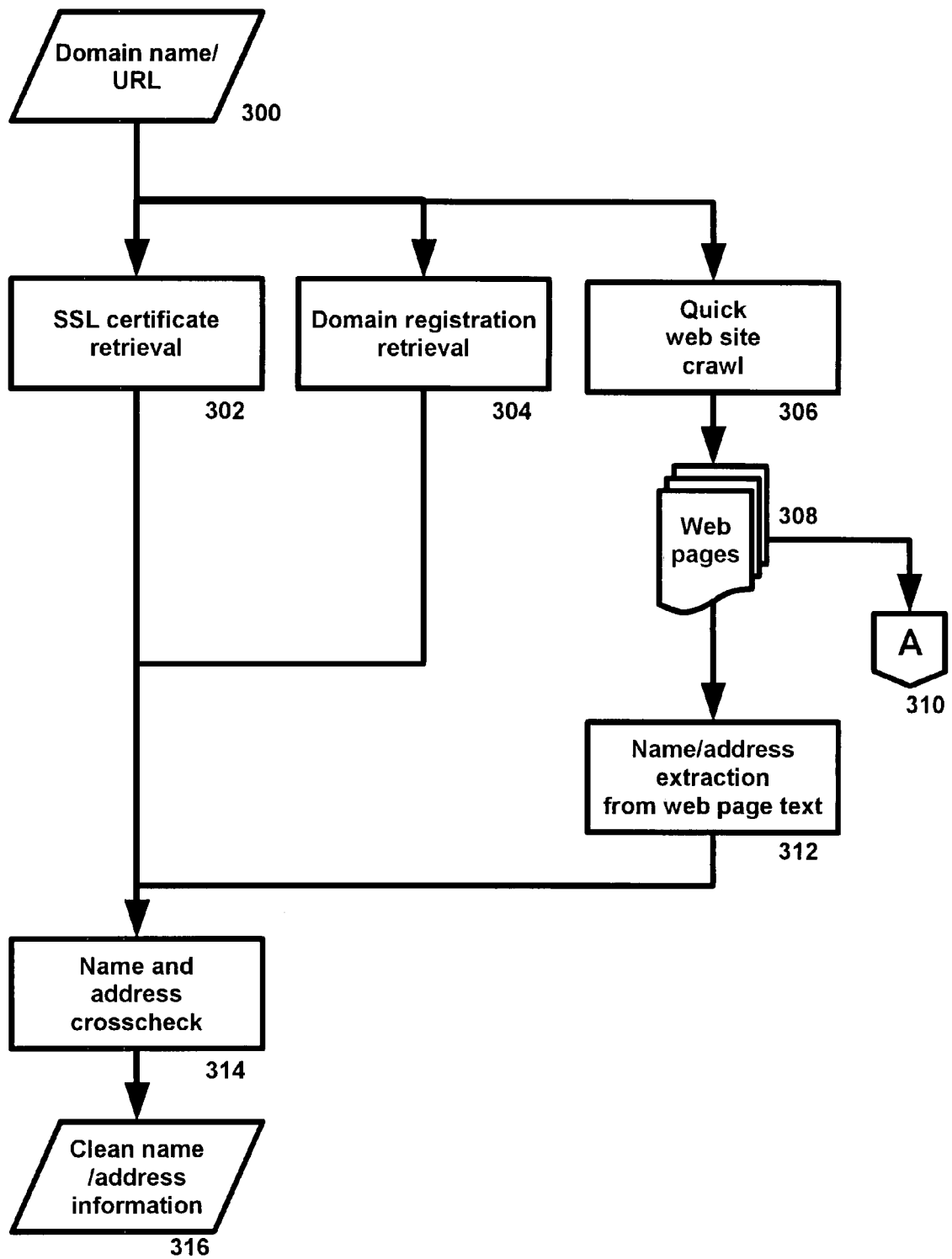
FIG. 3 illustrates the name and address extraction process shown in FIG. 2.

FIG. 3 illustrates the name and address extraction process step 206. The procedure begins with the domain name 300, which as earlier described is associated with a URL. The object of the procedure is to obtain the name and address of the owner of the domain and the web site.

This is more difficult than it may seem. Some background is required. While in theory it should be possible to simply obtain this information from the information provided when the domain was registered, in practice much of the information provided for domain registration, especially for less-legitimate businesses, is missing, ambiguous, fraudulent, or simply wrong. Thus, one needs to check multiple sources for this information.

The information provided at the time the domain was registered is retrieved, using the standard WHOIS protocol, in a step 304. The method also retrieves in a step 302 what is known as the "Secure Sockets Layer" certificate, or "SSL certificate," also known as a "X.509 certificate" after the standard which defines such certificates. Such certificates are issued by certification authorities (Verisign, Inc. being the largest), and are digitally signed. Certificates of various levels of assurance are available; some have undergone a verification process comparable to notarization, and some provide little or no assurance of identity. Not all sites have SSL certificates.

The third source of name and address information is the web site itself. The site's most prominent pages are examined using a quick web site crawl 306, which results in a small set of web pages 308. (The set of web pages is also sent to other processing in FIG. 9, as indicated by off-page connector A 310). The pages are examined 312 for names and addresses, using standard techniques typically used for mailing lists and envelope generation from unstructured text.

Data from these three sources comes together at a step 314, further described below in conjunction with FIG. 5, where the addresses are normalized, compared, and inconsistencies noted. This cleaned-up name and address information is returned in step 316.

Figure 4:
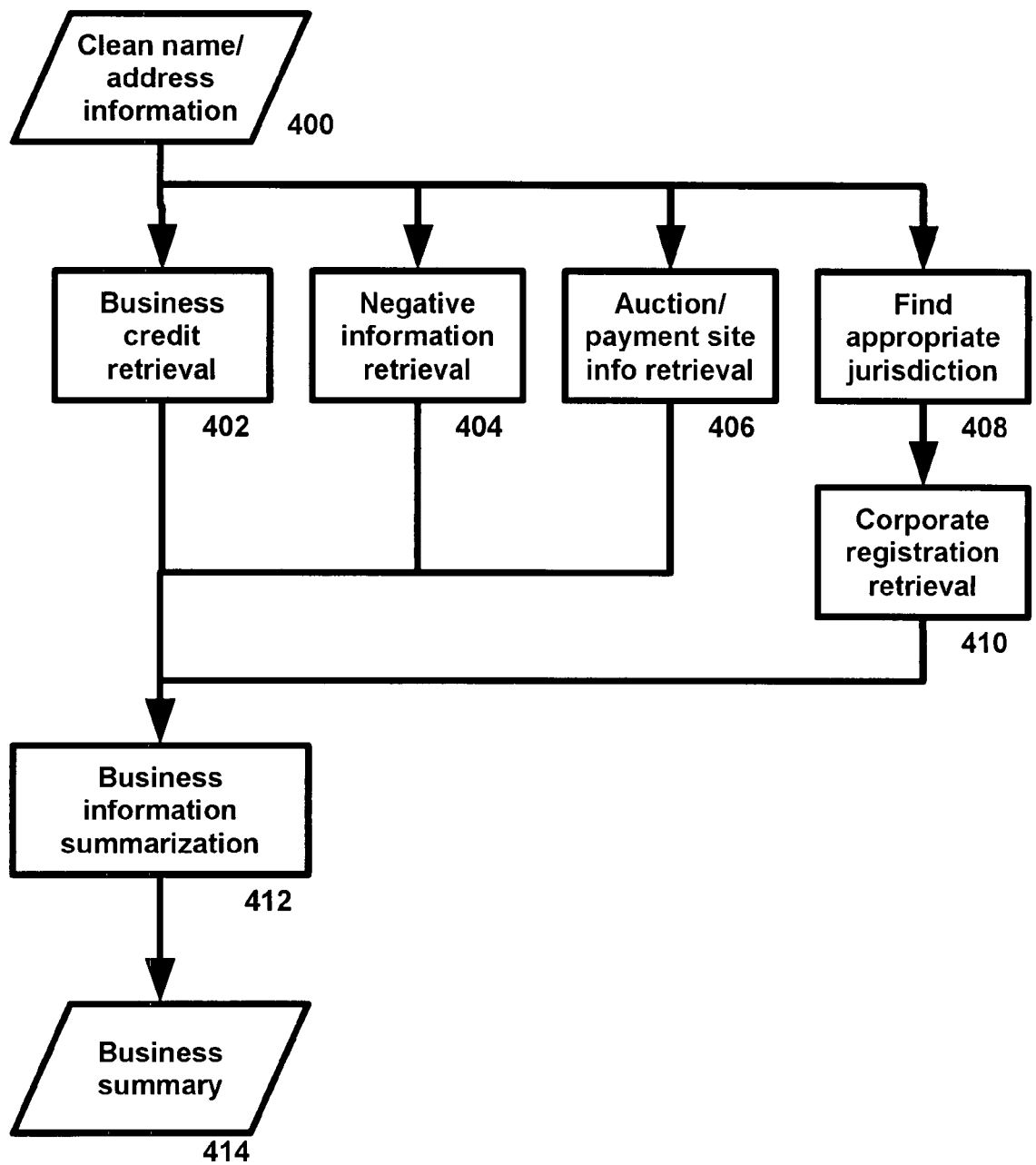
FIG. 4 illustrates the process of business information retrieval shown in FIG. 2.

FIG. 4 illustrates the business information retrieval step 210. This is an automated "due diligence" on a business. Processing begins with clean name and address information 400 from previous name and address extraction. Four primary sources of business information are preferably queried, namely, business rating agencies (such as Dun and Bradstreet, Inc.) are queried in a step 402, negative information sources (such as regulatory agencies) are queried in a step 404, corporate registration information is queried in steps 408 and 410, and, for the special case of well-recognized auction sites and payment systems which undertake to rate, or at least reliably identify, their affiliated merchants, rating information is obtained from said auction and payment site in step 406.

Corporate registration information can be obtained directly from public records, which are accessible via on-line query systems operated by states, provinces, and countries for most of the developed countries of the world. The appropriate jurisdiction to query is determined in step 408, and the actual query is made in step 410.

Verifying that the business entity has a legal existence and is known to business rating agencies is a significant check. The basic question being answered by this component of the method in accordance with one embodiment of the present invention is "If someone needed to collect from this business, could the business be found?" If the answer to that question is "no," then the business will receive a low integrity score. Further decision making based on credit information is also an option.

The information collected in the previous steps is combined in a step 412. The collected information is assembled into a business summary 414, which is returned to the caller.

Figure 5:
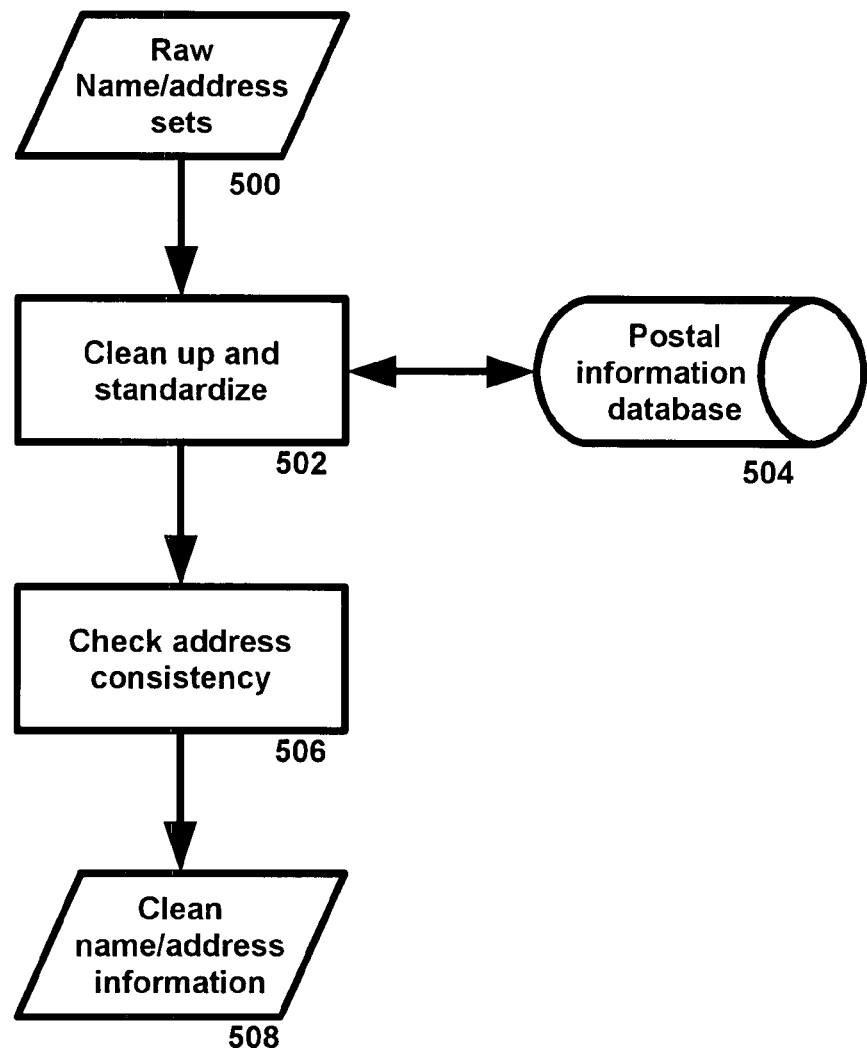
FIG. 5 illustrates the name and address crosscheck process shown in FIG. 3.

FIG. 5 illustrates the name and address crosscheck step 314. Processing here is similar to that employed in cleaning up mailing lists, a known technology. The raw names and addresses 500 are processed through a cleanup and standardization step 502, which utilizes a database of postal information 504 (valid addresses, address versus Zip Code, etc.). The addresses, once standardized, are compared with each other in a step 506. If addresses disagree, for example, the address of the domain registration retrieved back at step 304 disagrees with the address on the SSL certificate retrieved back at step 302, the address information is tagged with lower confidence, which will be reflected in the web site's integrity score. Clean name and address information is returned in a step 508.

Figure 6:
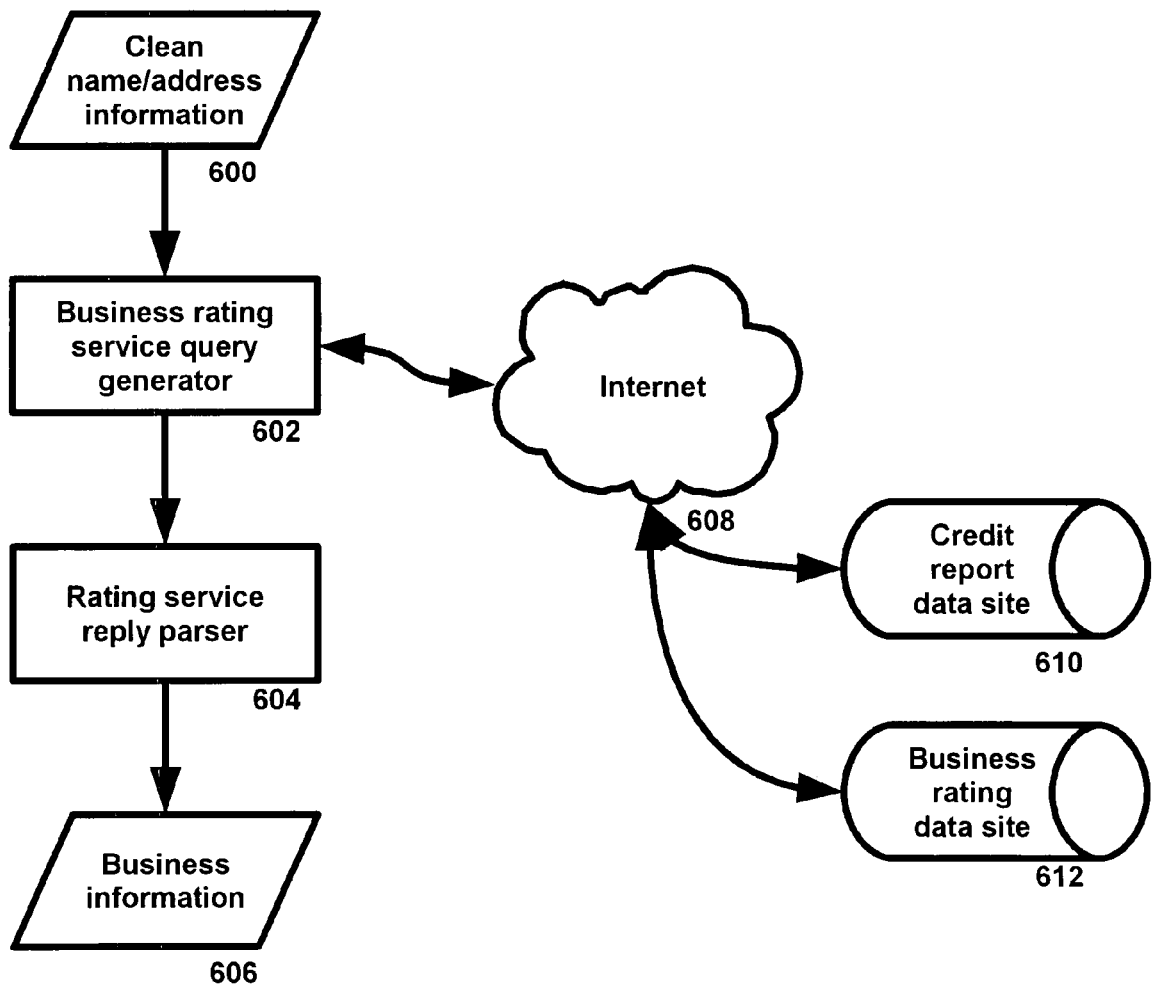
FIG. 6 illustrates the process of business information retrieval shown in FIG. 4.

FIG. 6 illustrates the business retrieval step 402. Clean name and address information 600 is passed to the business rating service query generator 602, which, via the Internet 608 queries various business rating report data sites 610 and business rating data sites 612. Examples of such data sources are Dun and Bradstreet, Inc. and ChoicePoint, Inc. The results are parsed by the rating service reply parser 604. Because the formats of the data sources queried are known, this is accomplished with known technology. The resulting information is returned to the caller in step 606.

Figure 7:
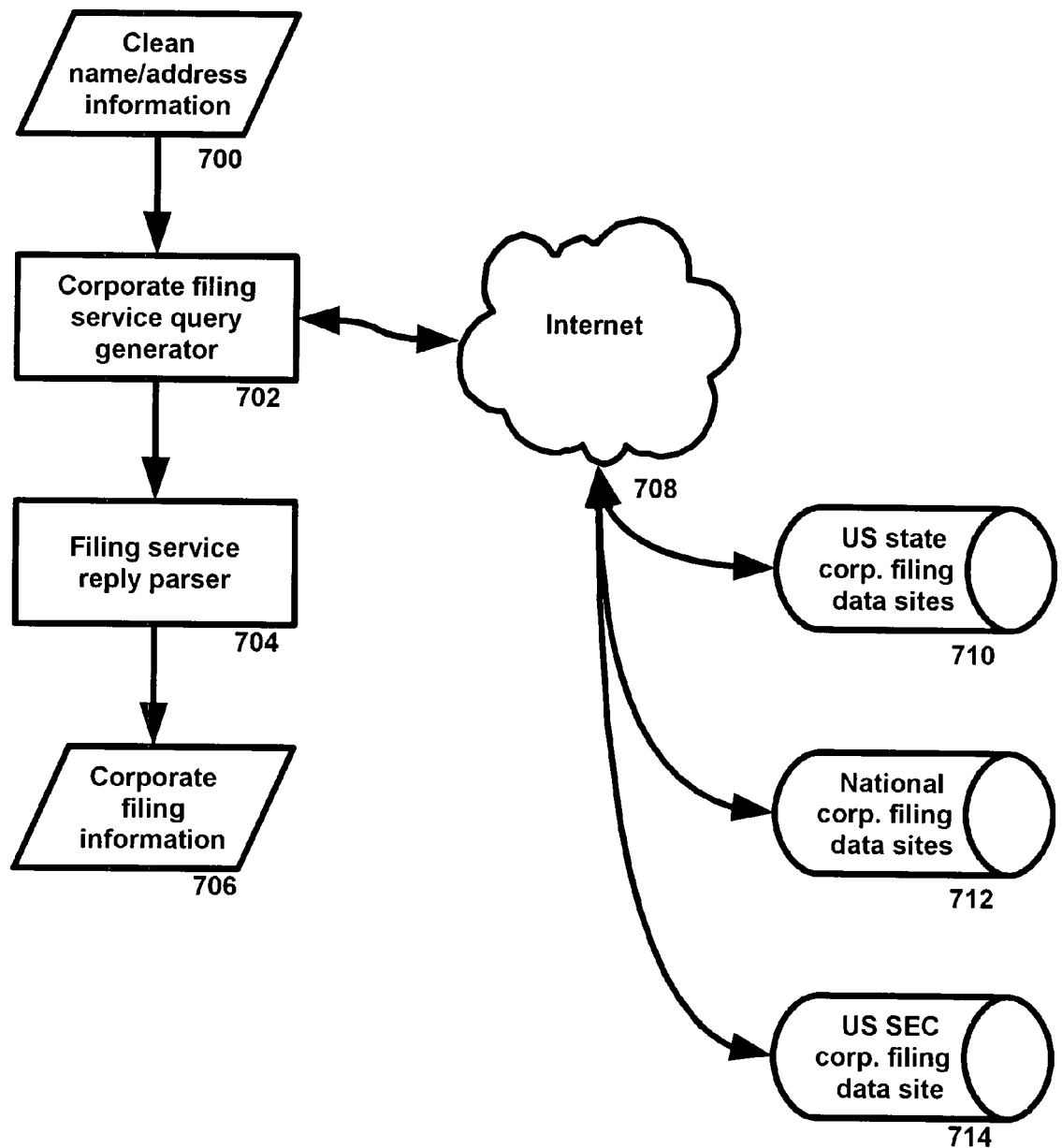
FIG. 7 illustrates the corporate information retrieval process shown in FIG. 4.

FIG. 7 illustrates the corporate information retrieval step 410, which is very similar to business retrieval. Clean name and address information 700 is passed to the corporate filing service query generator 702, which, via the Internet 708 queries various corporate filing data sites 710, 712, and 714. Examples of such data sources are the EDGAR system of the United States Securities and Exchange Commission, the Secretary of State web sites of various U.S. States, and Companies House, which is the corporate registrar for the United Kingdom. The results are parsed by the filing service reply parser 704. Because the formats of the data sources queried are known, this is accomplished with known technology. The resulting information is returned to the caller in a step 706.

Figure 8:
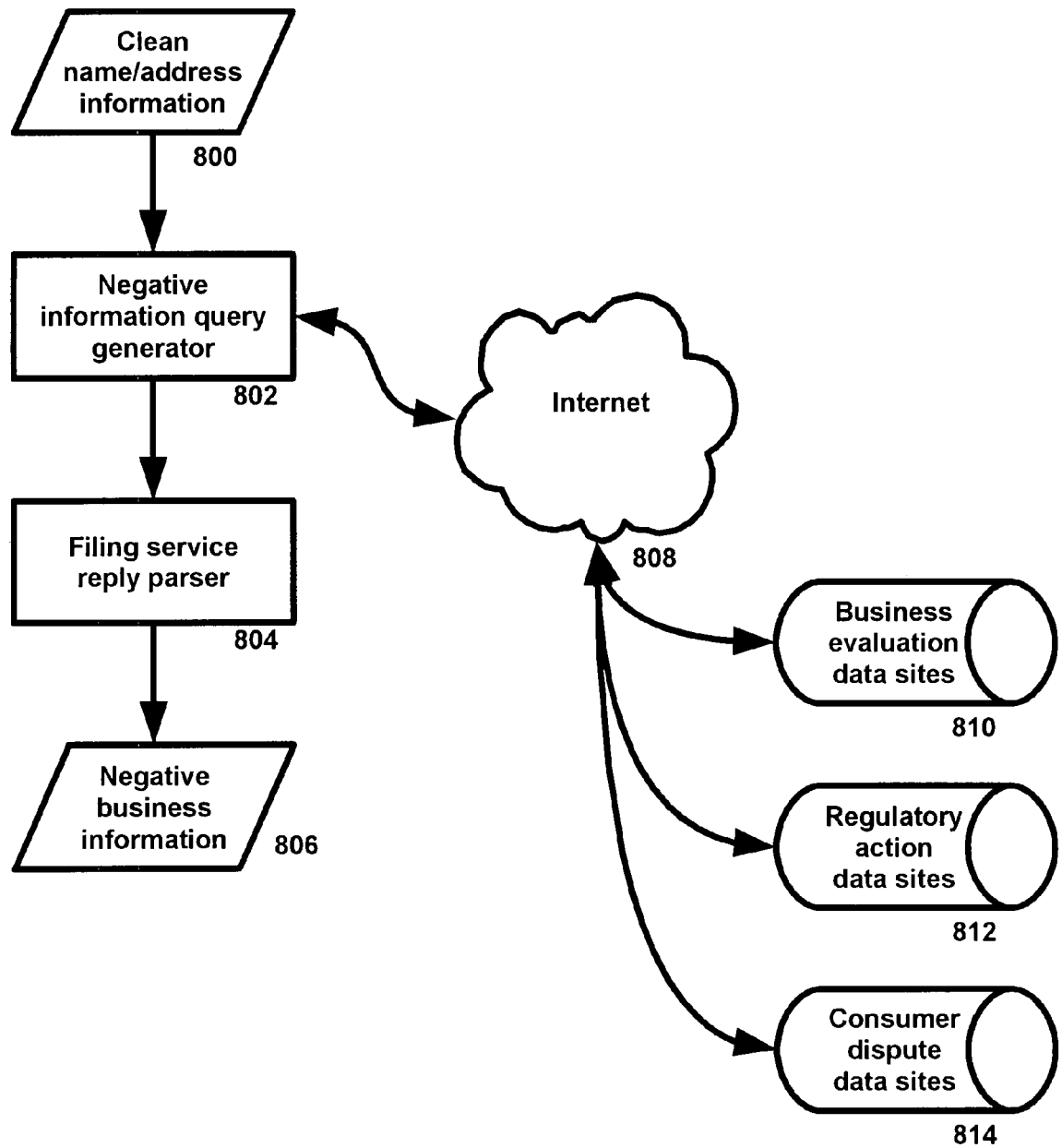
FIG. 8 illustrates the process of negative information retrieval shown in FIG. 4.

FIG. 8 illustrates the negative information retrieval step 404, which is very similar to business retrieval. Clean name and address information 800 is passed to the negative information query generator 802, which, via the Internet 808 queries various negative information sources 810, 812, and 814. Examples of such sources are the Better Business Bureau and the National Fraud Information Center. The results are parsed by the parser 804. Because the formats of the data sources queried are known, this is accomplished with known technology. The resulting information is returned to the caller in step 806.

Figure 9:
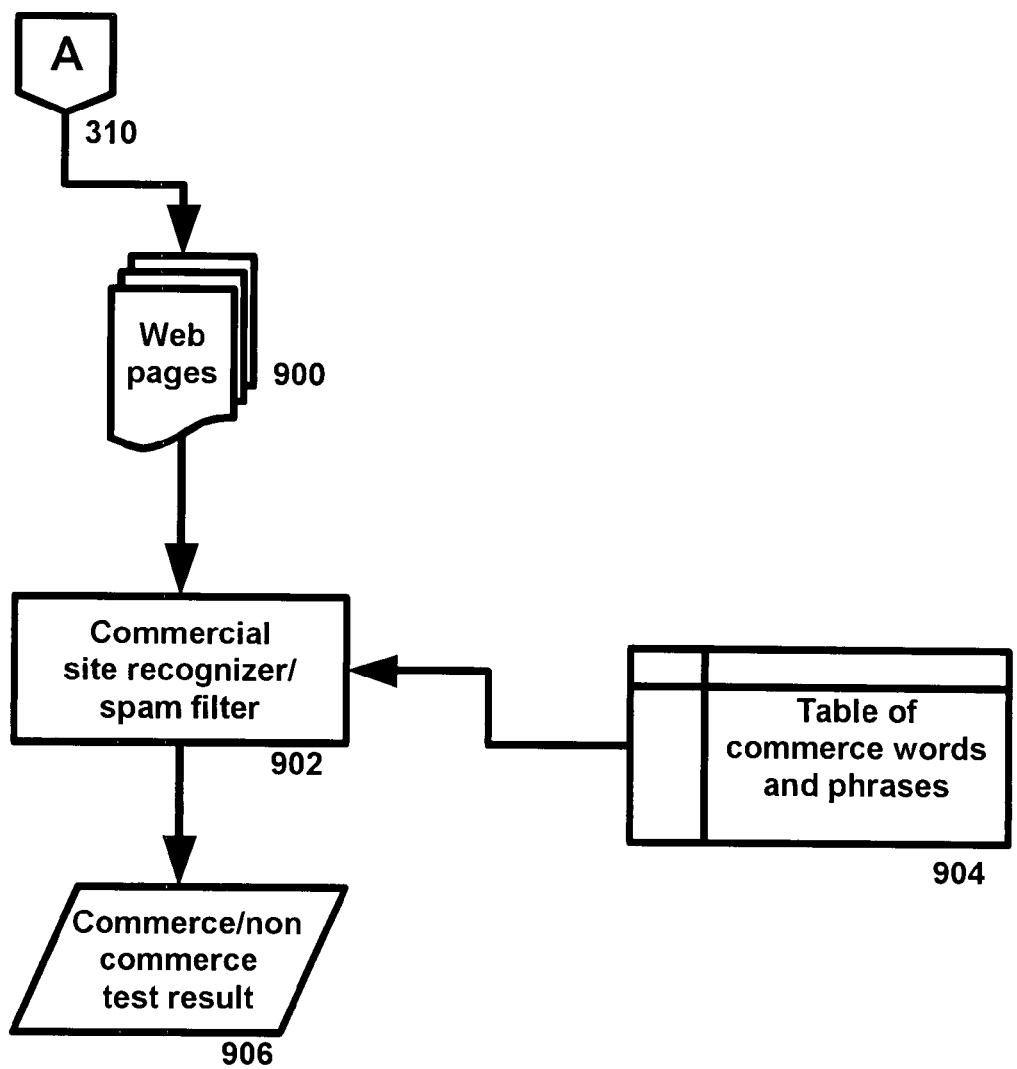
FIG. 9 illustrates the commerce site test shown in FIG. 2.

FIG. 9 illustrates the commerce site test 214, which attempts to determine whether or not a web site is selling something. The test begins with the set of web pages 900 delivered via connector A 310 (from FIG. 3) and originated by the quick web site crawl, which will be described in more detail below in conjunction with FIG. 10. The text of the web pages is examined for indications that the web site is selling something. This is an operation similar to checking electronic mail for unsolicited commercial messages, or "spam," and thus step 902 is the recognition portion of a known technology, a "spam filter," which uses a collection of words and phrases commonly seen in advertising and marketing 904. The result, which is a yes/no decision, is returned in step 906.

Figure 10:
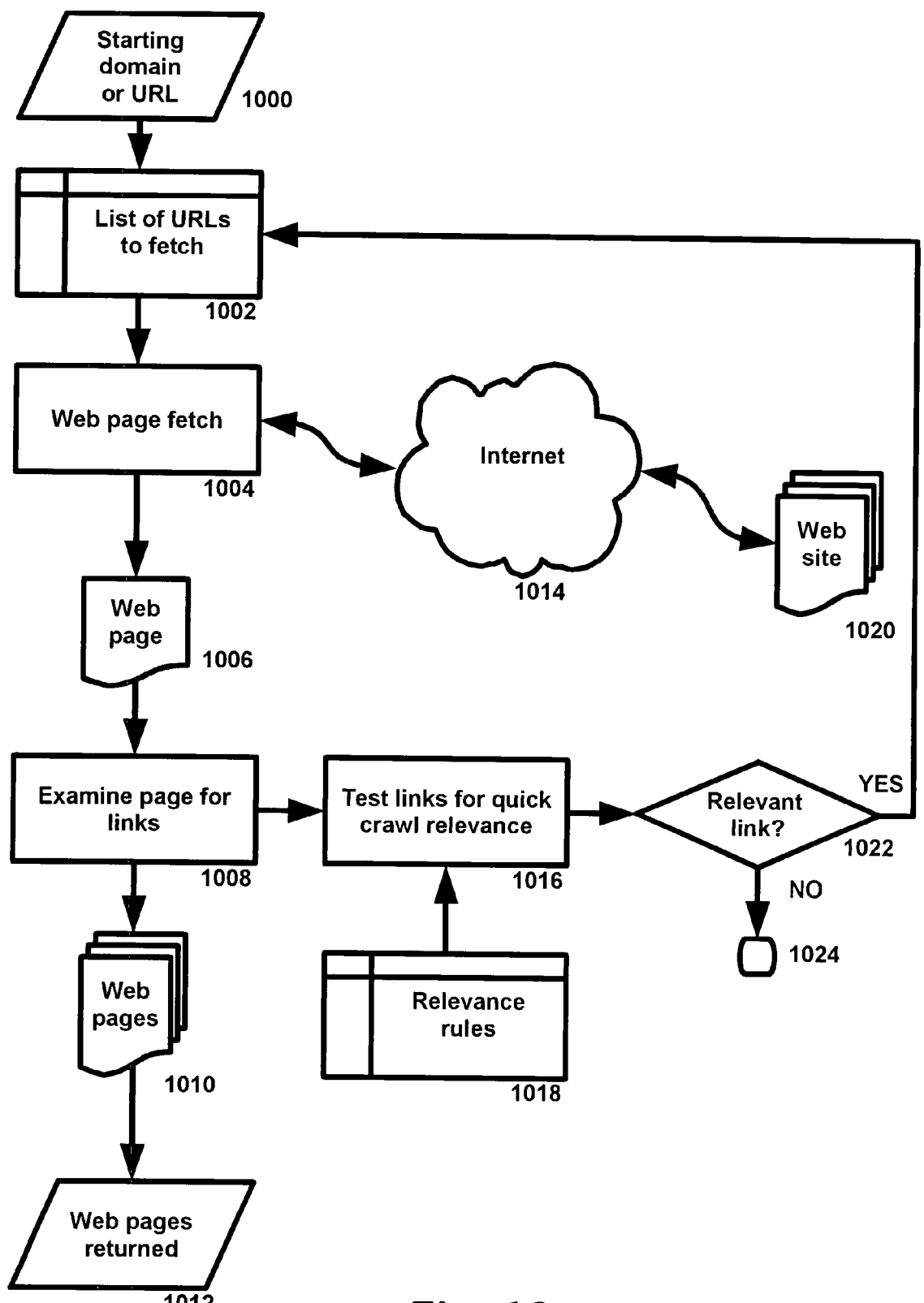
FIG. 10 illustrates the quick web site crawl shown in FIG. 3.

FIG. 10 illustrates the quick web site crawl step 306. It is not necessary to examine all the web pages of a site to look for names and addresses of the site owner and to determine whether or not a site is selling something. A relatively shallow crawl, limited to a small number of web pages, is sufficient. It is generally apparent from the first few pages of a web site if the site is selling something, since sites which hide the items for sale are not generally commercially successful. As for finding the site owner, if the method in accordance with the various embodiments of the present invention is unable to find the name and address of the web site operator because that information is hidden in an obscure place on the web site, the site is not in compliance with state legislation requiring that such information be prominently located. Thus, there is no need and no duty to exhaustively examine every page of the site.

The process begins with a starting domain name or URL 1000, which is added to the list of URLs to fetch 1002. For each such URL, the relevant web page is fetched by a web page reader 1004 (sometimes known as a "web spider") via the Internet 1014 and the target web site 1020. The result is a local copy of the web page 1006.

The page is then examined 1008 for links to other web pages, and passed to a relevance tester 1016, which uses a set of relevance rules 1018. The relevance rules determine which links are worth processing further. The first page is always relevant, and pages linked from the first page are relevant up to some limit. All links with words that indicate the possibility of finding site ownership information (such as "About" or "Contact" or "Help," etc.) are relevant, and links to known off-site payment systems (such as "PayPal") are relevant. Links found to be relevant pass the test at step 1022 and are fed back into the list of URLs to fetch. Links which are not relevant are ignored in a step 1024. The pages 1010 collected by this process are returned to the caller in a step 1012.

Figure 11:
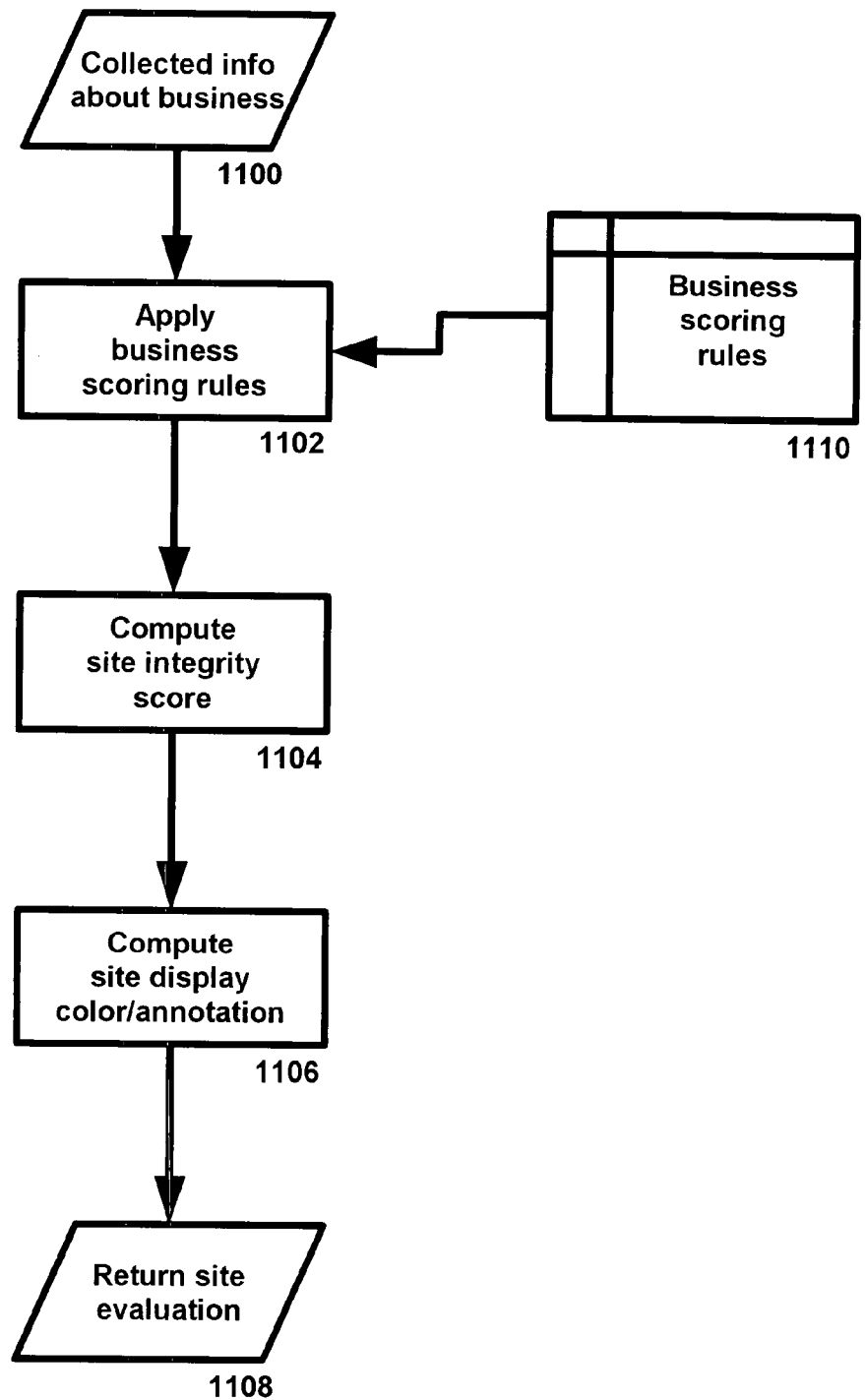
FIG. 11 illustrates business scoring rules.

FIG. 11 illustrates the business scoring rules associated with the step 218. The information collected about a business 1100, which is received from the processing in FIG. 6, is processed 1102 by applying scoring rules 1110. These rules are similar to credit scoring rules, a known technology. From this result a site integrity score is computed in step 1104, from which a simplified display annotation 1106 may be determined (such as coloring the result to be returned to the user in red, yellow, green, or uncolored) and the results are returned to the caller in step 1108.

Figure 12:
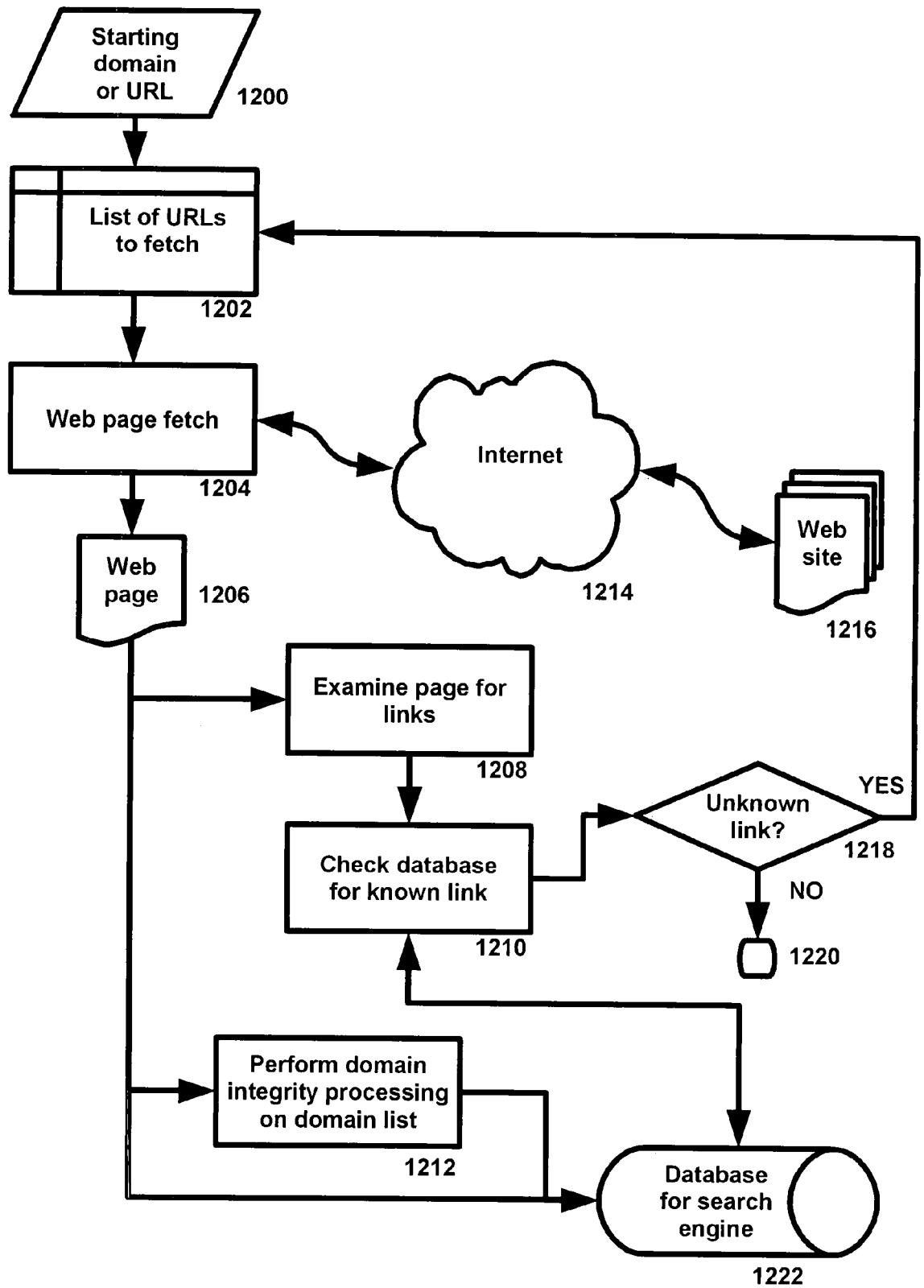
FIG. 12 illustrates an alternative embodiment of the method in accordance with the present invention as a background web crawler.

FIG. 12 illustrates an alternative embodiment of the method in accordance with the present invention as a background web crawler. In accordance with the first embodiment described above in conjunction with FIG. 1, domain integrity evaluation was performed on an on-demand basis as search requests arrived. This is an approach most suitable to a smaller search engine. A comprehensive search engine which indexes the entire World Wide Web is more suitably implemented by performing domain integrity evaluation in bulk, in advance of search queries. Such a search engine typically has a background crawler continuously scanning through the entire World Wide Web. FIG. 12 illustrates a basic version of such a crawler. A starting URL or list thereof 1200 is used to initialize the crawler, which then adds that to its list of URLs to be read 1202. For each such URL, the corresponding web page 1206 is fetched 1204 from the web site 1216 via the Internet 1214. The page is then examined for links 1208, and the database 1222 is checked 1210 to determine if each link has already been processed. The test 1218 determines whether or not the link is unknown, in which case the link is fed back into the list of links to fetch 1202. Otherwise, the link is a duplicate and need not be processed again 1220.

In addition to the above, which is known web crawling technology, the method in accordance with the embodiment of the present invention shown in FIG. 12 adds the improvement of performing the step of domain processing and integrity evaluation 1212, as previously described in conjunction with FIG. 2, on the domain list and by adding that information to the database of information 1222 used by the search engine to rank web sites. The overall result from the user perspective is similar to that from the approach described in conjunction with FIG. 1, but allows for economies of scale and increased performance for large-scale search engines. In addition, this closer integration with the search engine allows the use of the integrity information 1212 to adjust the rating of links from a page, and the business information also collected in step 1212 and placed in the database 1222 allows the search engine to recognize, and to rate accordingly, when multiple web sites are controlled by the same party.

Figure 13:
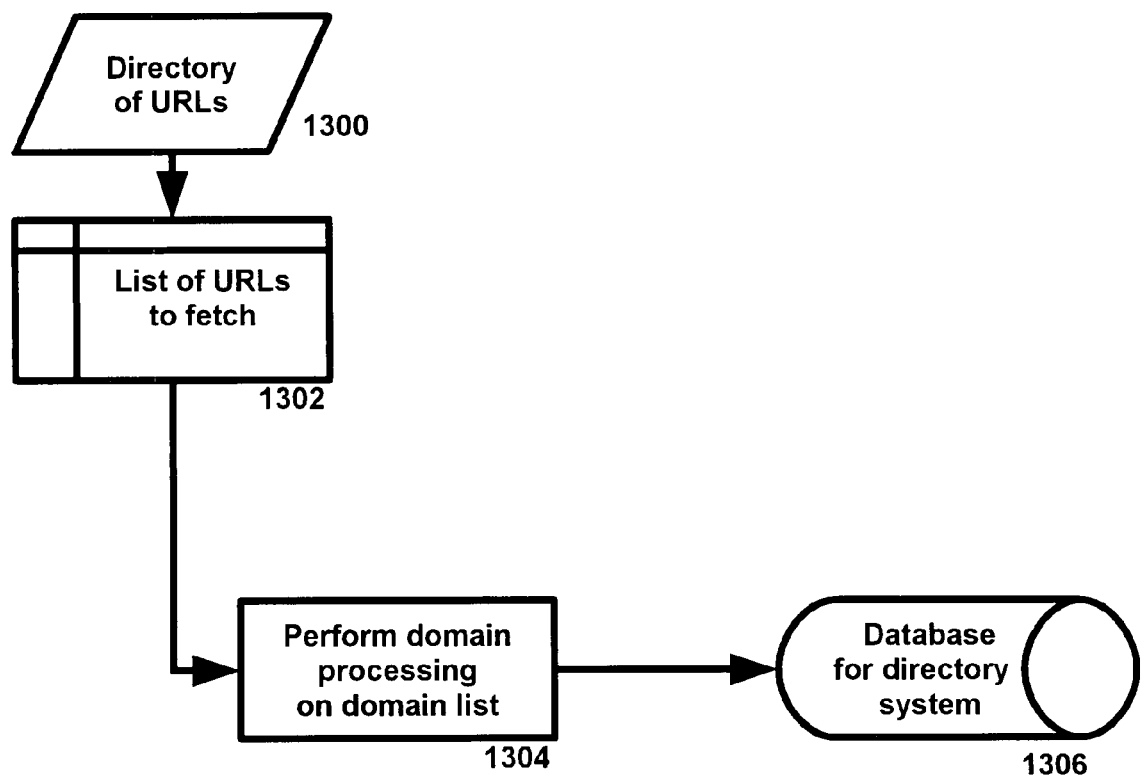
FIG. 13 illustrates another alternative embodiment of the method in accordance with the present invention, in which an existing directory of sites is processed.

FIG. 13 illustrates another alternative embodiment of the method in accordance with the present invention, in which an existing directory of sites, such as that collected by the Open Directory Project or, commercially, by various companies including Yahoo! Inc., is run through similar processing as previously described. The directory of URLs 1300 is used to generate a list of URLs to be fetched 1302. Each such URL is presented to the processing step 1304 which performs the same site integrity evaluation as previously described in conjunction with FIG. 2, and the database 1306 used to present the directory to the browser is then updated, allowing the directory to be reordered or annotated according to the site integrity information.

Figure 14:
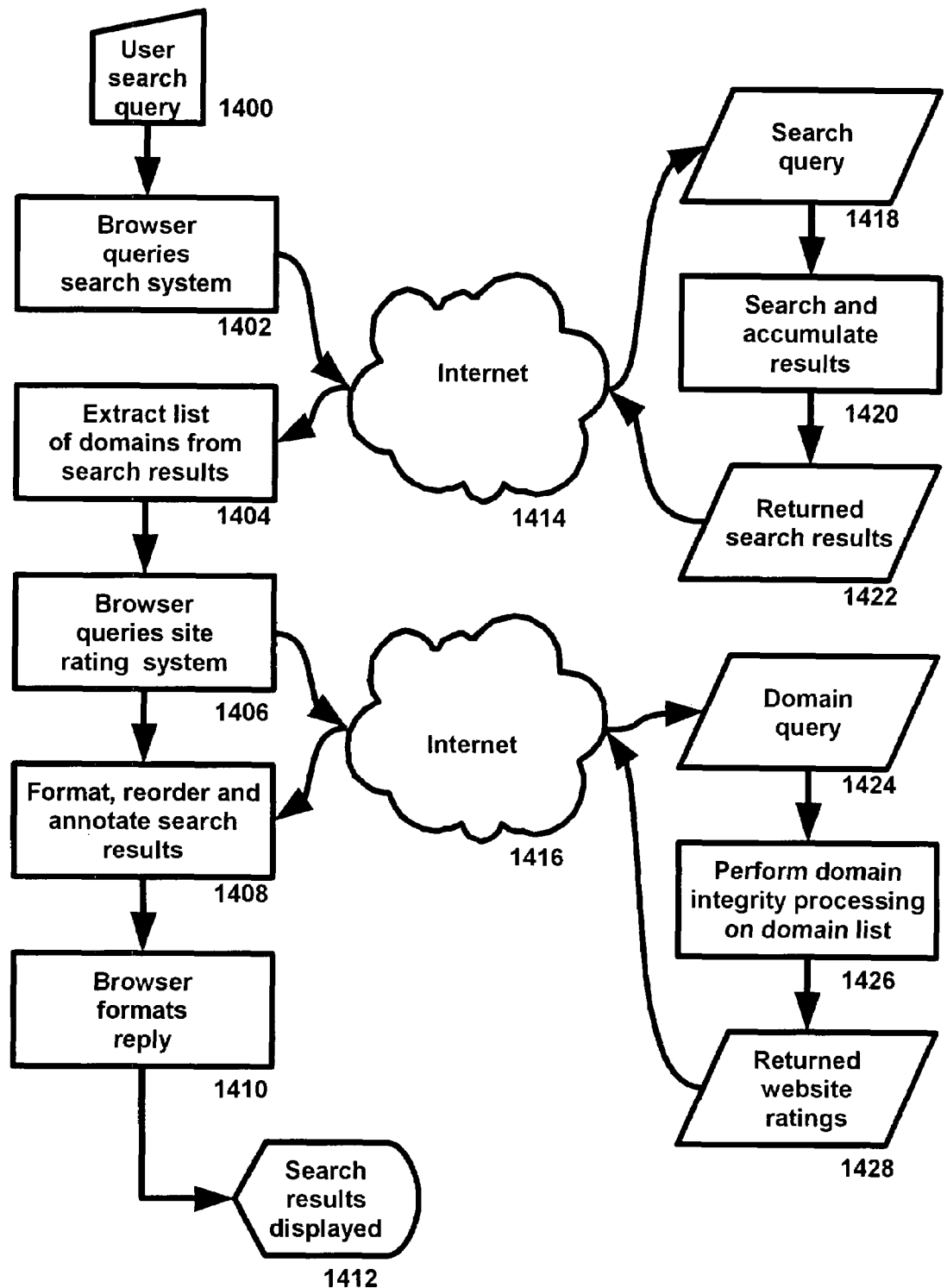
FIG. 14 illustrates yet another alternative embodiment of the method in accordance with the present invention, in which the search engine and the evaluation of site integrity are performed by completely separate services and integrated from within the user's web browser.

FIG. 14 illustrates yet another alternative embodiment of the method in accordance with the present invention, one in which the search engine and the evaluation of site integrity are performed by completely separate services and integrated from within the user's web browser. As described previously in conjunction with FIG. 1, the user search query 1400 is presented to a browser, which queries a search system 1402 via the Internet 1414. The search engine is known technology comprised of the steps of accepting the search query 1418, performing the search and accumulating results 1420, and returning the search results 1422.

Upon return of this search result data to the browser, processing within the browser 1404 extracts the list of domains mentioned in the search results. This list of domains is then used to generate a query to the site rating system 1406, which is sent by the Internet 1416 to the site integrity rating system, which is comprised of receiving a domain query 1424, performing domain processing on a list of domains 1426 (as described earlier in conjunction with FIG. 2), and returning a set of web site ratings 1428 via the Internet 1416.

Processing in the browser then formats, reorders, and annotates the previously obtained search results using the domain rating information 1408. This output is then preferably formatted for display to the user 1410 and displayed on the user's display device 1412.

The browser-side processing described above can be performed using known techniques, implemented as either a "browser toolbar" or as a web page containing code which reprocesses information from another web site, using standard implementation techniques such as "Active-X Controls," "Java Applets," or "AJAX techniques." The overall result from the user perspective is similar to that from the approach described in conjunction with FIG. 1, but allows for a relatively low-cost implementation.

FIGS. 15A and 15B illustrate the effect as presented to the user of formatting, reordering, and annotating search results. FIG. 15A illustrates a typical set of search results 1500 before the improvements provided by the method in accordance with the various embodiments of the present invention have been applied. FIG. 15B illustrates the same search results 1502 after domain integrity has been evaluated and the results of that evaluation have been applied to the appearance of the search results. The web sites rated as having higher integrity are identified with a suitable symbol, for this example a check mark in a circle 1504. The sites for which insufficient information could be obtained are identified with a different symbol such as a question mark in a circle 1506. The sites rated as lower integrity are identified, for example, with an "X" in a circle 1508. The sites rated with higher integrity have been moved to the top of the displayed list 1502. Conversely, those with lower integrity have been moved down and are preferably displayed in smaller type 1510. The symbols shown here are by way of example only and not by way of limitation.

Figure 16:
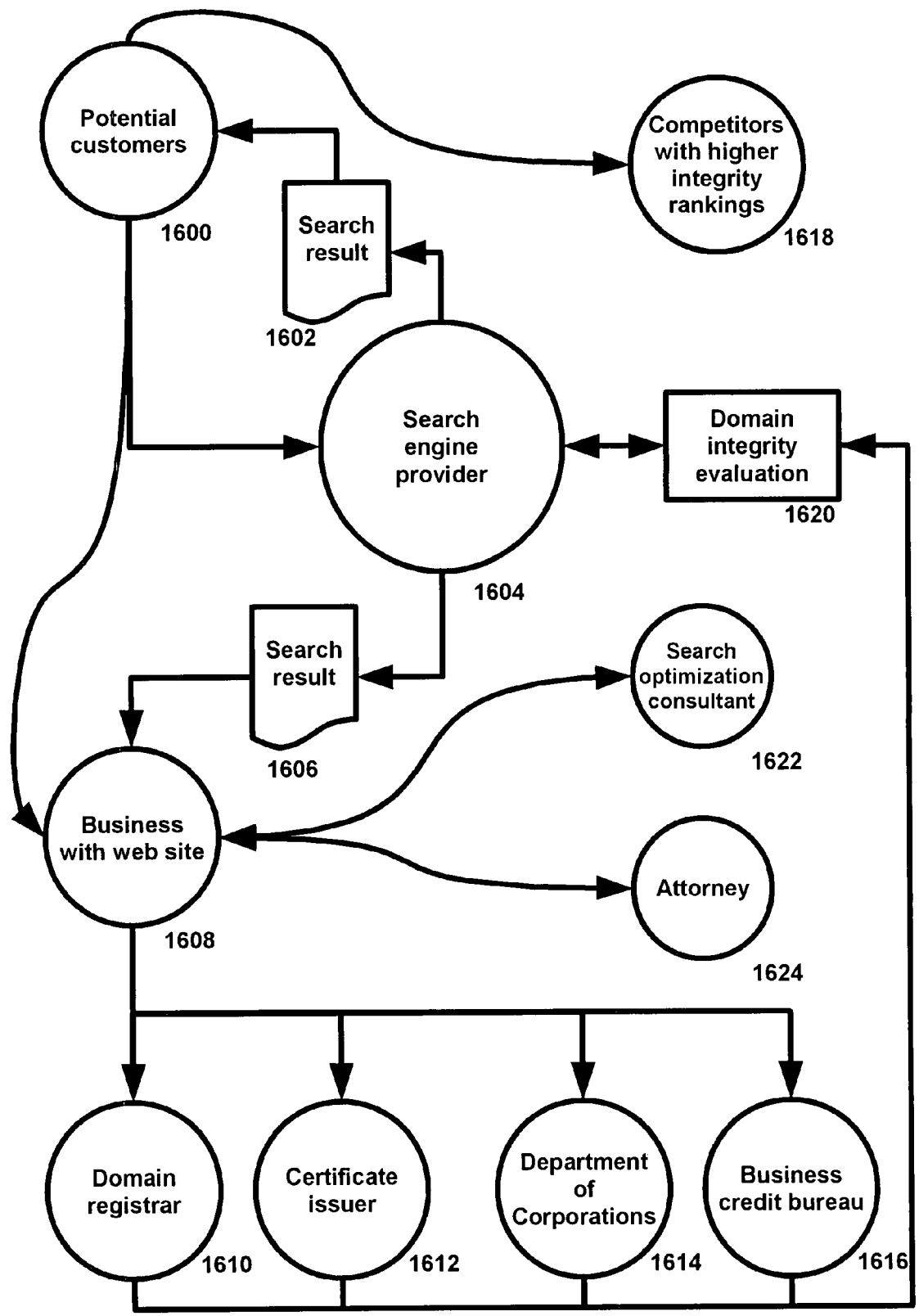
FIG. 16 illustrates the system of incentives created by one embodiment of the method in accordance with the present invention.

FIG. 16 illustrates the mechanism of incentives created by one embodiment of the method in accordance with the present invention. One of the objects of the present invention is to encourage the proprietors of web sites to improve their legitimacy by complying with appropriate laws, regulations, and business practices. This occurs through the process depicted in FIG. 16. Potential customers 1600 query a search engine provider 1604 and obtain a search result 1602 annotated and ordered using the methods in accordance with the various embodiments of the present invention. Without the method of the present invention, customers 1600 would have been directed to the business having web site 1608. With the method of the present invention, customers are directed towards potential competitors 1618 with higher integrity ratings.

The business with web site 1608 then observes a decline in web traffic from the search engine provider 1604 and queries said search engine provider to observe the business's search engine positioning. Observing their low integrity rating in the search result 1606, the business 1608 then takes steps to remedy its compliance problems, optionally consulting a search engine optimization consultant 1622 and/or an attorney 1624. The business then takes compliance actions such as updating its corporate filings, or, if necessary, incorporating, resulting in records updates at the Department of Corporations or similar authority 1614. The business may also take steps to upgrade its business rating by obtaining a rating from a business rating bureau 1616 and may update its domain registration 1610 to contain the correct name and address of the business. The business may also purchase a digital certificate authenticating its business identity from a certificate issuer 1612.

The domain integrity evaluation system 1620, previously described in conjunction with FIG. 2, then obtains updated information from the domain registrar 1610, certificate issuer 1612, the Department of Corporations 1614, and the business information bureau 1616. The records of the search engine provider 1604 are thus updated based on the now improved integrity rating.

Potential customers 1600 thereafter obtain search results 1602 which tend to encourage them to do business with the business 1608. The business 1608 then sees increased sales as a result of their compliance.

Businesses which are not sufficiently legitimate to obtain a business credit rating, a corporate registration, or a digital certificate authenticating their identity, or which decline to provide a valid address in their domain registration, will experience considerable difficulty in improving their integrity rating and may experience a decline in their business.

Figure 17:
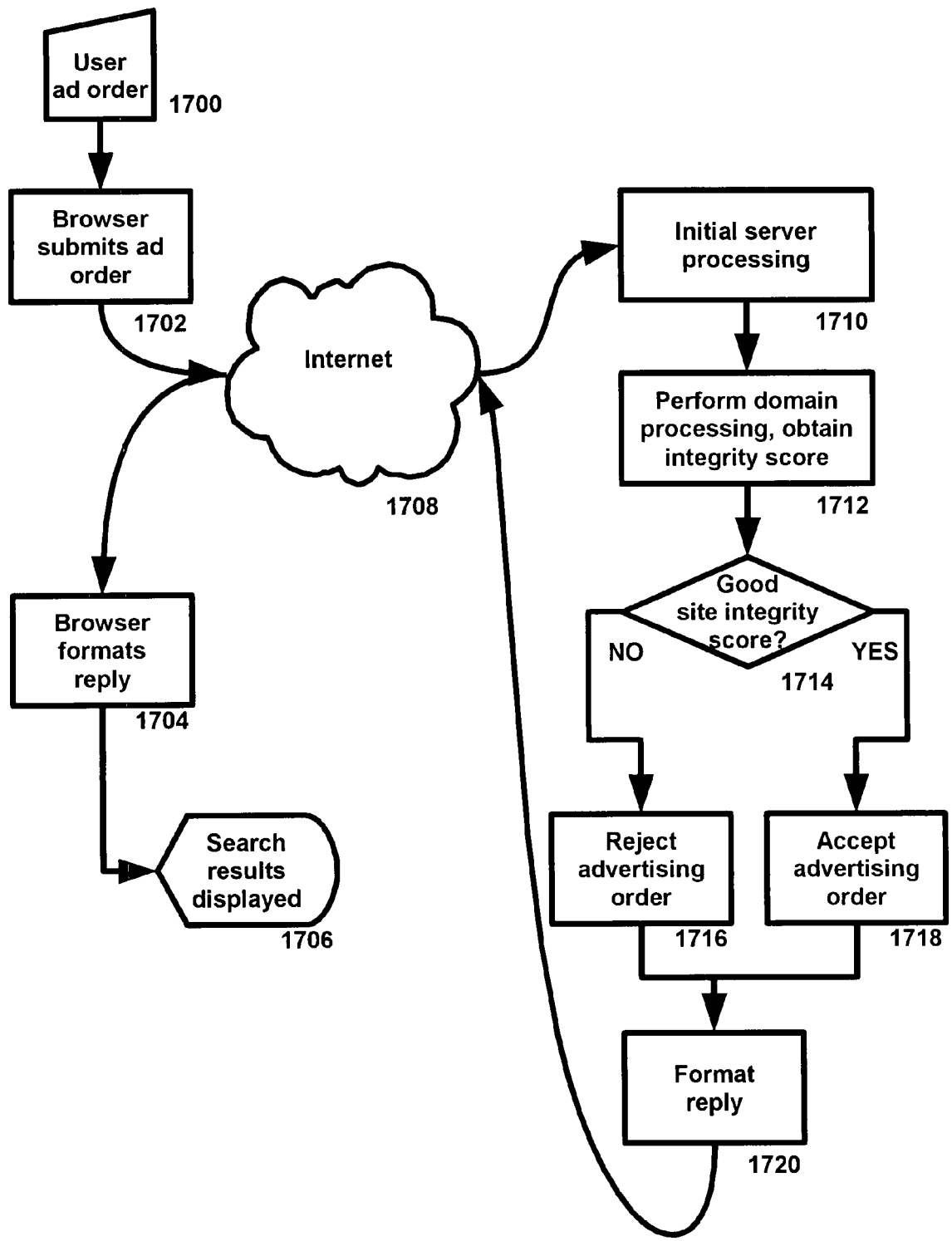
FIG. 17 illustrates a related system to the system shown in FIG. 16 for validating on-line advertising sales.

FIG. 17 illustrates a related mechanism for validating on-line advertising sales. Many requests for on-line advertising are processed entirely without human intervention, which allows less than legitimate businesses to easily place advertising on legitimate web sites. FIG. 17 illustrates another use of the integrity scoring process. An advertiser places an on-line order for on-line advertising 1700, which is submitted through a web browser 1702 and the Internet 1708 to a web site that sells advertising. Initial server processing in the web server 1710 is performed, which includes obtaining the URL and domain name to be advertised. These are submitted to a step 1712 which performs domain processing and obtains the site integrity score as previously described. The integrity score is tested 1714 against a threshold, and if too far below the threshold of acceptability, the ad order is rejected 1716. If the integrity score is sufficient, the ad order is accepted 1718, and a reply to the advertiser is formatted 1720 and returned via the Internet 1708 to the advertiser's browser 1704 which formats it for display 1706 to the advertiser. This process has the effect of preventing advertisers of questionable legitimacy from placing ads on major web sites, thereby improving customer satisfaction, increasing the value of the advertising medium, and making the ad space more valuable.

In accordance with various embodiments of the present invention, there are two approaches for software implementation to be executed by a computer. Preferably, the system is implemented via a hosted Web server and alternatively with a client-hosted Web server.

Figure 18:
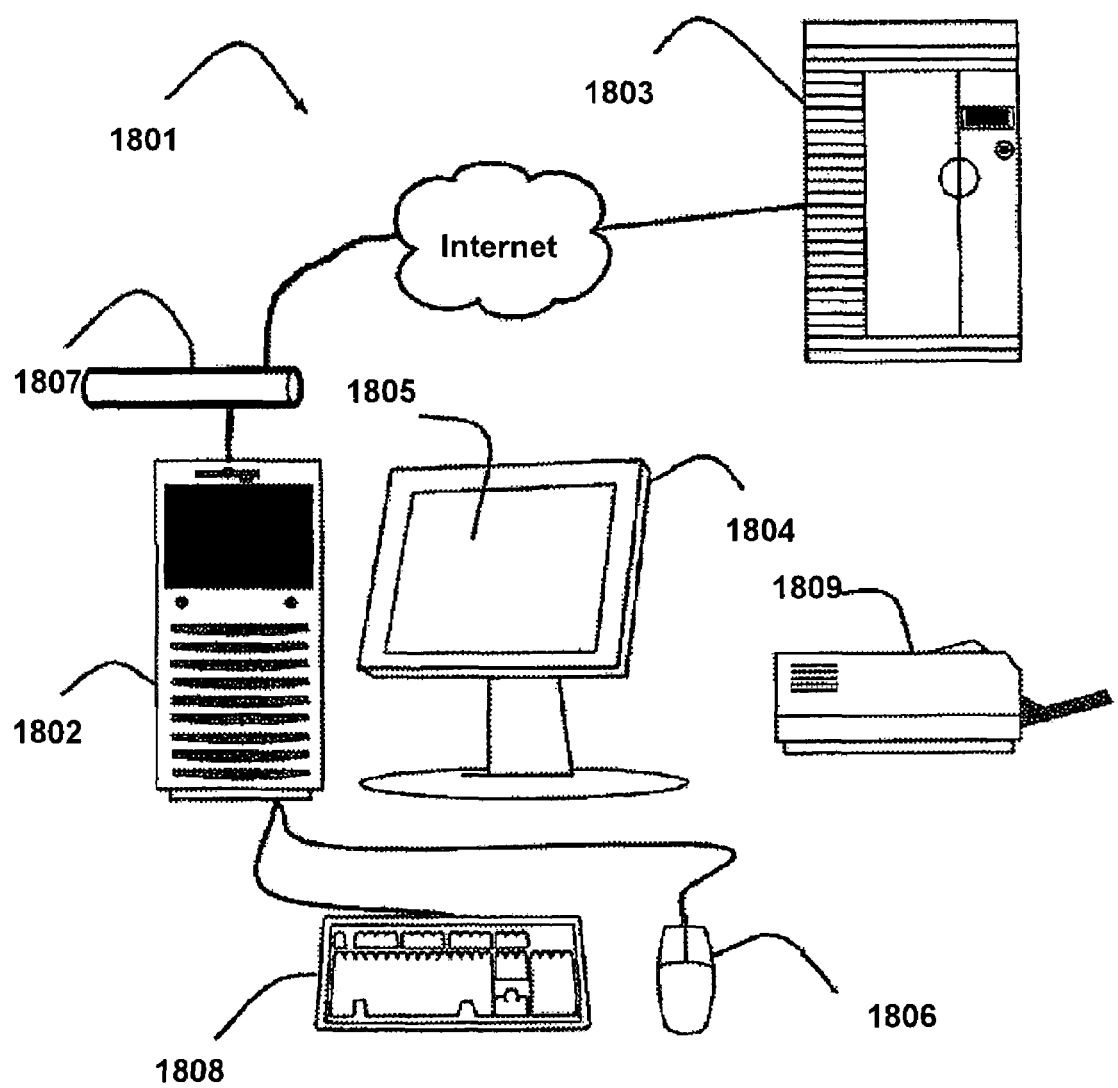
FIG. 18 is a diagram of an exemplary system in accordance with a preferred embodiment of the present invention implemented on a personal computer coupled to a web or Internet server.

A system using a hosted Web server, generally indicated by the numeral 1801, is shown in FIG. 18. The system 1801 preferably comprises a Web-based application accessed by a personal computer 1802, as shown in FIG. 18. For example, the personal computer 1802 may be any personal computer having at least 256 megabytes of random access memory (RAM) and preferably includes one gigabyte of RAM, using a Web browser, preferably Microsoft Internet Explorer 6.0 or greater. In this example, the system 1801 is a 128-bit SSL encrypted secure application running on a Microsoft Windows Server 2003 or Windows Server 2000 or later operating system available from Microsoft Corporation located in Redmond, Wash. The personal computer 1802 also comprises a hard disk drive preferably having at least 40 gigabytes of free storage space available. The personal computer 1802 is coupled to a network 1807. For example, the network 1807 may be implemented using an Internet connection. In one implementation of the system 1801, the personal computer 1802 can be ported to the Internet or Web, and searching is performed by a server 1803. The network 1807 may be implemented using a broadband data connection, such as, for example, a DSL or greater connection, and is preferably a T1 or faster connection.

The graphical user interface of the system 1801 is preferably displayed on a monitor 1804 connected to the personal computer 1802. The monitor 1804 comprises a screen 1805 for displaying the graphical user interface provided by the system 1801. The monitor 1804 may be a 15" color monitor and is preferably a 1024×768, 24-bit (16 million colors) VGA monitor or better. The personal computer 1802 further comprises a 256 or more color graphics video card installed in the personal computer. As shown in FIG. 18, a mouse 1806 is provided for mouse-driven navigation between screens or windows comprising the graphical user interface of the system 1801. The personal computer 1802 is also preferably connected to a keyboard 1808. The mouse 1806 and keyboard 1808 enable a user utilizing the system 1801 to perform a search having improved integrity. Preferably, the user can print the results using a printer 1809.

Figure 19:
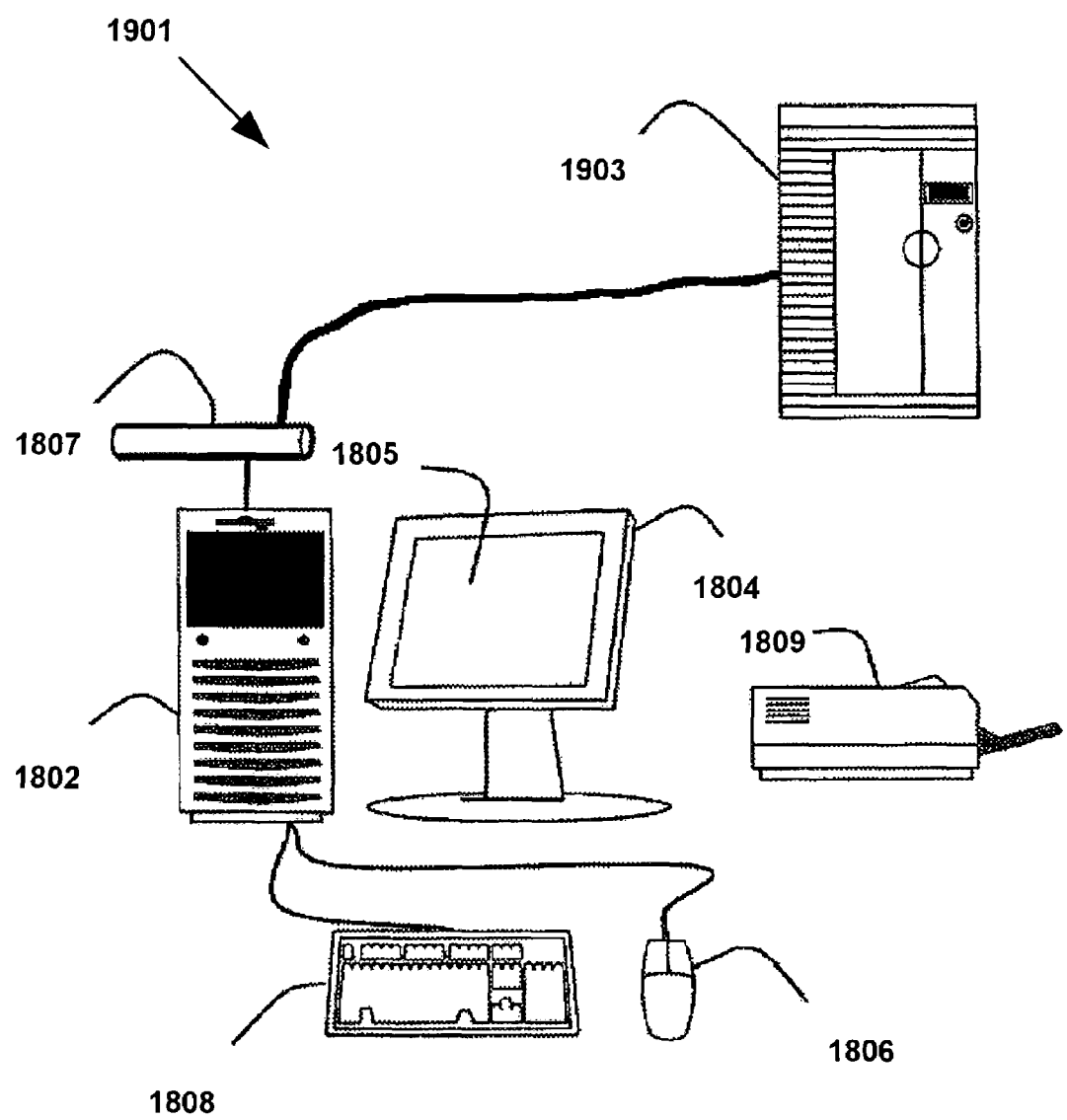
FIG. 19 is a diagram of an exemplary system in accordance with an alternative embodiment of the present invention implemented on a local area network personal computer.

In another implementation of the system 1901, searching with improved integrity is preformed by an application installed on a local area network Web server 1903, as shown in FIG. 19. The application is a hosted application developed with active server page(s) (ASP) code together with a SQL server database hosted and accessed via Microsoft Internet Explorer 6.0 or greater and available for Microsoft XP® and other operating systems.

The system 1801 or 1901 is implemented as a Web-based application, and data may be shared with additional software (e.g., a word processor, spreadsheet, or any other business application). Persons skilled in the art will appreciate that the systems and techniques described herein are applicable to a wide array of business and personal applications.

While the foregoing description has been with reference to particular embodiments of the present invention, it will be appreciated by those skilled in the art that changes to these embodiments may be made without departing from the principles and spirit of the invention. Accordingly, the scope of the present invention can only be ascertained with reference to the appended claims.

What is claimed is:

1. A computer-implemented method for improving the integrity of search results, comprising the steps of:
   receiving a search query from a user via a web browser, the Internet, and a web server;
   using a search engine to obtain a set of potential search results using the search query;
   for each Internet domain or web site mentioned in the search results, accessing a set of data sources to obtain extrinsic information concerning the legitimacy of a business associated with the Internet domain or web site, said extrinsic information comprising one or more sources of information consisting of physical location information, governmental compliance information, business rating information, certification information, consumer protection information, and information in accordance with recognized or accepted business standards or principles available from a source other than the Internet domain or web site mentioned in the search results;
   computing a legitimacy score for the domain or web site;
   using said legitimacy score to reorder or to change or to augment the appearance or presentation of the search result for said Internet domain or web site; and
   returning the processed search results to the user.

2. The method of claim 1 further comprising the step of displaying the search results to the user.

3. The method of claim 1 wherein the data sources used for evaluating business legitimacy comprise information selected from the group of information consisting of domain name registry, digitally signed certificates issued by certificate authorities, business information, state and national corporation records, business license records, filings with the U.S. Securities and Exchange Commission, enforcement actions by criminal justice agencies, and enforcement actions by industry self-regulation groups.

4. The method of claim 1, further comprising the steps of:
   providing one or more local databases containing summary information derived from said data sources of extrinsic information;
   providing a program or "web crawler" which examines web sites in advance of user queries; and
   using said summary information to compute a legitimacy score to reorder or to change or to augment the appearance or presentation of the search result for said Internet domain or web site.

5. Computer code stored in or on computer-readable storage media to be executed by a computer system including a web server and at least one other computer connected to the Internet to improve the integrity of search results, comprising:
   first code for receiving a search query from a user of the computer via a web browser, the Internet, and the web server;
   second code for using a search engine to obtain a set of potential search results using the search query;
   for each Internet domain or web site mentioned in the search results, third code for accessing a set of data sources to obtain extrinsic information concerning the legitimacy of a business associated with the Internet domain or web site, said extrinsic information comprising one or more sources of information consisting of physical location information, governmental compliance information, business rating information, certification information, consumer protection information, and information in accordance with recognized or accepted business standards or principles available from a source other than the Internet domain or web site mentioned in the search results;
   fourth code to compute a legitimacy score for the domain or web site;
   fifth code using said legitimacy score to reorder or to change or to augment the appearance or presentation of the search result for said Internet domain or web site; and
   sixth code for returning the processed search results to the user.

6. The system of claim 5 further comprising a display device and sixth code for displaying the search results to the user.

7. The system of claim 5 wherein the data sources used for evaluating business legitimacy comprise information selected from the group of information consisting of domain name registry, digitally signed certificates issued by certificate authorities, business information, state and national corporation records, business license records, filings with the U.S. Securities and Exchange Commission, enforcement actions by criminal justice agencies, and enforcement actions by industry self-regulation groups.

8. The system of claim 5, further comprising:
   one or more local databases containing summary information derived from said data sources of extrinsic information;
   a "web crawler" which examines web sites in advance of user queries; and
   seventh code for using said summary information to compute a legitimacy score to reorder or to change or to augment the appearance or presentation of the search result for said Internet domain or web site.

* * * * *